(12) United States Patent
Perkins

(10) Patent No.: US 6,276,390 B1
(45) Date of Patent: Aug. 21, 2001

(54) COMBINATION AIR RELEASE VALVE

(75) Inventor: Lee A. Perkins, Lowden, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 0 days.

(21) Appl. No.: 09/448,893

(22) Filed: Nov. 29, 1999

(51) Int. Cl.$^7$ .................................................. F16K 24/04

(52) U.S. Cl. .......................................... 137/202; 251/901

(58) Field of Search .............................. 137/202; 251/901

(56) References Cited

U.S. PATENT DOCUMENTS

| | | |
|---|---|---|
| 70,511 | 11/1867 | Bourden . |
| 212,556 | 2/1879 | Johnson . |
| 934,045 | 2/1909 | Cotter . |
| 1,138,994 | 5/1915 | Steele . |
| 1,576,709 | 3/1926 | Bassier . |
| 2,180,173 | 11/1939 | Share . |
| 2,216,000 | 9/1940 | Crawford . |
| 2,386,051 | 10/1945 | Kempton . |
| 2,449,573 | 9/1948 | White . |
| 2,675,025 | 4/1954 | Wynkoop . |
| 2,677,387 | 5/1954 | Crawford . |
| 2,977,972 | 4/1961 | Billeter . |
| 3,000,395 | 9/1961 | Waterfill . |
| 3,021,861 | 2/1962 | Billeter et al. . |
| 3,049,146 | 8/1962 | Hayes . |
| 3,053,275 | 9/1962 | Waterfll . |
| 3,154,091 | 10/1964 | Richards et al. . |
| 3,230,965 | 1/1966 | Richards . |
| 3,230,966 | 1/1966 | Richards . |
| 3,236,493 | 2/1966 | Richards . |
| 3,259,142 | 7/1966 | Richards . |
| 3,437,104 | 4/1969 | Richards . |
| 3,605,546 | 9/1971 | Klann . |
| 3,726,313 | 4/1973 | Pandya . |
| 3,741,234 | 6/1973 | Siebold . |
| 3,766,933 | 10/1973 | Nicholson, Jr. . |
| 3,771,563 | 11/1973 | Hayner . |
| 3,773,077 | 11/1973 | Barnebey . |
| 3,794,068 | 2/1974 | Milroy . |
| 3,905,576 | 9/1975 | Fox, Jr. . |
| 3,951,168 | 4/1976 | Roberts . |
| 3,973,582 | 8/1976 | Siebold . |
| 4,082,106 | 4/1978 | Butcher . |
| 4,084,617 | 4/1978 | Happe . |
| 4,092,998 | 6/1978 | Taplin . |

(List continued on next page.)

FOREIGN PATENT DOCUMENTS

| | | |
|---|---|---|
| 897639 | 7/1949 | (DE) . |
| 957920 | 2/1957 | (DE) . |
| 2522084 | 11/1976 | (DE) . |
| 0724098 | 7/1996 | (EP) . |
| 536543 | 5/1941 | (GB) . |

OTHER PUBLICATIONS

A.R.I. Flow Control Accessories advertising literature, Oct. 1989.
Air Valves—Barak Specification, printout from internet, Sep. 1998.
Bermad—Air & Vacuum Release Valves, advertising literature, Dec. 1994.

Primary Examiner—Gerald A. Michalsky
(74) Attorney, Agent, or Firm—Nixon & Vanderhye P.C.

(57) ABSTRACT

An air release valve comprising a housing having a fluid inlet and a fluid outlet, a valve plate within the housing between the inlet and outlet, the valve plate having an aperture therein; a valve seal assembly including a reinforced portion engageable with the valve plate overlying the aperture and a flexible portion having an elongated groove formed therein and at least partially overlapping an edge of the aperture; one end of the valve seal assembly secured to the housing; a float located in the housing upstream of the valve plate, with the opposite end of the seal assembly connected to an upper end of the float.

15 Claims, 5 Drawing Sheets

U.S. PATENT DOCUMENTS

| | | |
|---|---|---|
| 4,104,004 | 8/1978 | Graef . |
| 4,106,524 | 8/1978 | Wunsch . |
| 4,147,183 | 4/1979 | Kalsi . |
| 4,163,456 | 8/1979 | Herron . |
| 4,193,417 | 3/1980 | Bowman et al. . |
| 4,335,743 | 6/1982 | Jones . |
| 4,390,036 | 6/1983 | Athanassiu et al. . |
| 4,484,728 | 11/1984 | Moore . |
| 4,488,702 | 12/1984 | Lapeyre . |
| 4,664,139 | 5/1987 | Pfeiffer . |
| 4,770,201 | 9/1988 | Zakai . |
| 5,020,567 | 6/1991 | Proulx . |
| 5,090,443 | 2/1992 | Jackobsen . |
| 5,313,977 | 5/1994 | Bergsma et al. . |
| 5,368,276 | 11/1994 | Pfeiffer . |
| 5,605,175 | 2/1997 | Bergsma et al. . |
| 5,738,132 | 4/1998 | Zakai et al. . |
| 5,762,090 | 6/1998 | Halamish et al. . |
| 5,794,646 | 8/1998 | Perkins . |
| 5,957,150 | 9/1999 | Perkins . |

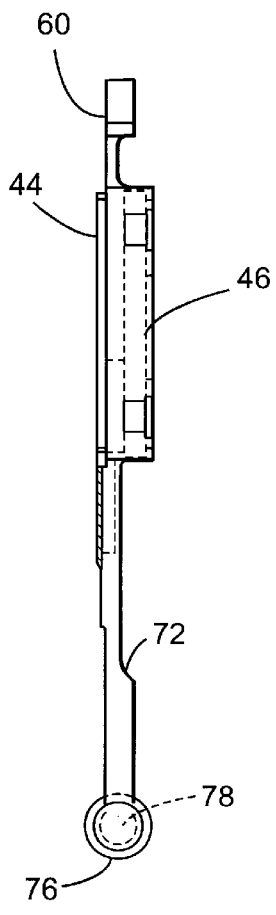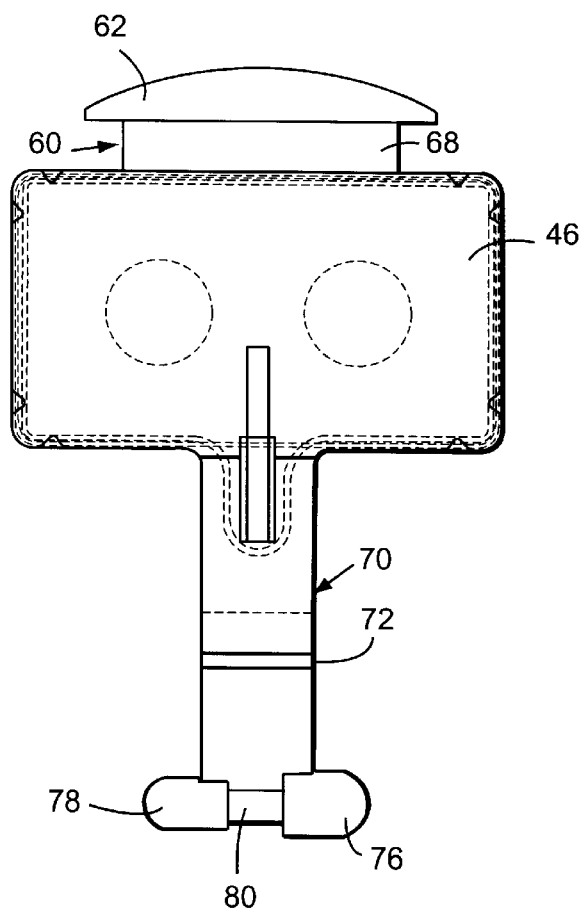
Fig. 5
Fig. 4

COMBINATION AIR RELEASE VALVE

TECHNICAL FIELD

This invention relates generally to air control valves for use in irrigation systems, and particularly to those valves which incorporate an air release or purge mechanism for removing air from a water pipe on start-up and during normal flow conditions, and which also provide vacuum relief when the pipe is drained.

BACKGROUND

Fluid flow valves which include air release or air purge features are well known. These valves are generally located within liquid conduits and are designed to insure the continuous release of air or other gases to avoid air locks which otherwise interfere with the flow of liquid through the conduit. So-called combination valves are also known which also function to purge air from the conduit on start-up and to provide vacuum relief upon system shut down. These valves incorporate a flexible valve seal assembly connected to a float which rises and falls within the valve body to open and close the valve in a predetermined manner to achieve the three functions stated above.

One known combination air release valve construction is disclosed in U.S. Pat. No. 4,770,201. Others are disclosed in commonly owned U.S. Pat. Nos. 5,794,646 and 5,957,150, and in pending application Ser. No. 09/288,858, now U.S. Pat. No. 6,145,533, the latter incorporated herein by reference. While the valves disclosed in the commonly owned patents, and particularly in the '858 application have performed fairly well, a problem has been encountered in that the small and large apertures in the valve seat are separated by a "wall" or "partition" which some times results in the smaller aperture becoming clogged. This, in turn, can result in a continuously leaking valve.

SUMMARY OF THE INVENTION

This invention addresses the clogging problem experienced with the discrete valve aperture design, by providing an improved valve seal assembly arrangement (described further below) which eliminates the smaller aperture in the valve seat.

In accordance with an exemplary embodiment of this invention, a combination air release valve is provided which substantially overcomes the above stated plugging problem. The valve includes a valve housing or riser adapted to be coupled to a fluid conduit. The housing includes an upstanding, substantially vertical portion and at least one 90° turn or elbow at the upper end of the housing. At the elbow, there is located a valve orifice plate arranged at an angle of about 45°, extending from the inside corner of the elbow upwardly to the outside corner of the elbow. The plate has a single rectangularly shaped aperture or valve seat which is adapted to be opened and closed by a valve seal assembly connected at one end to a float and at an opposite end to the valve housing. The valve seal assembly includes a flexible diaphragm which is made rigid in an area which seals against the valve plate surrounding the aperture, and which has a flexible narrow, tongue-like portion extending away from the rigid portion and to the float. Part of the flexible portion which was previously employed to seal a second slot-like aperture in the valve plate is now provided with an elongated groove that overlaps the rigid portion of the seal assembly.

As already mentioned, the seal assembly is connected at one end to the housing, specifically to the lowermost end of the valve plate, and at its opposite end to the float that is guided for vertical movement within the housing, upstream of the valve plate. With this new arrangement, as the float descends within the housing during normal operation to release small quantities of air which have bubbled up into the top of the housing, the flexible tongue-like portion of the seal will peel away from the valve plate, with the groove communicating between the valve housing and the valve seat aperture. The repetitive peeling and sealing action of the grooved portion of the membrane during the normal continuous air relief function apparently results in the expulsion of any debris caught in the groove.

Upon shutdown, the float will drop rapidly, with the tongue-like portion peeling off the valve seat and the reinforced portion pivoting away from the valve seat, relieving the vacuum in the pipe created by the shut down. The valve remains in the wide-open position, allowing air purge on start-up, with the seal assembly closing the aperture as water fills the housing, causing the float to rise.

The float itself is similar to that disclosed in commonly owned co-pending application Ser. No. 09/288,858, now U.S. Pat. No. 6,145,533, the entirety of which is incorporated herein by reference.

Accordingly, the present invention relates to an air release valve comprising a housing having a fluid inlet and a fluid outlet, a valve plate within the housing between the inlet and outlet, the valve plate having an aperture therein; a valve seal assembly including a reinforced portion engageable with the valve plate overlying the aperture and a flexible portion having an elongated groove formed therein and at least partially overlapping an edge of the aperture; one end of the valve seal assembly secured to the housing; a float located in the housing upstream of the valve plate, with the opposite end of the seal assembly connected to an upper end of the float.

Other objects and advantages of the invention will become apparent from the detailed description which follows.

BRIEF DESCRIPTION OF THE DRAWINGS

FIG. 4 is a bottom plan view of the valve seal assembly taken from FIG. 1;

FIG. 5 is a side elevation of the valve seal assembly in FIG. 4;

BEST MODE FOR CARRYING OUT THE INVENTION

Figure 1:
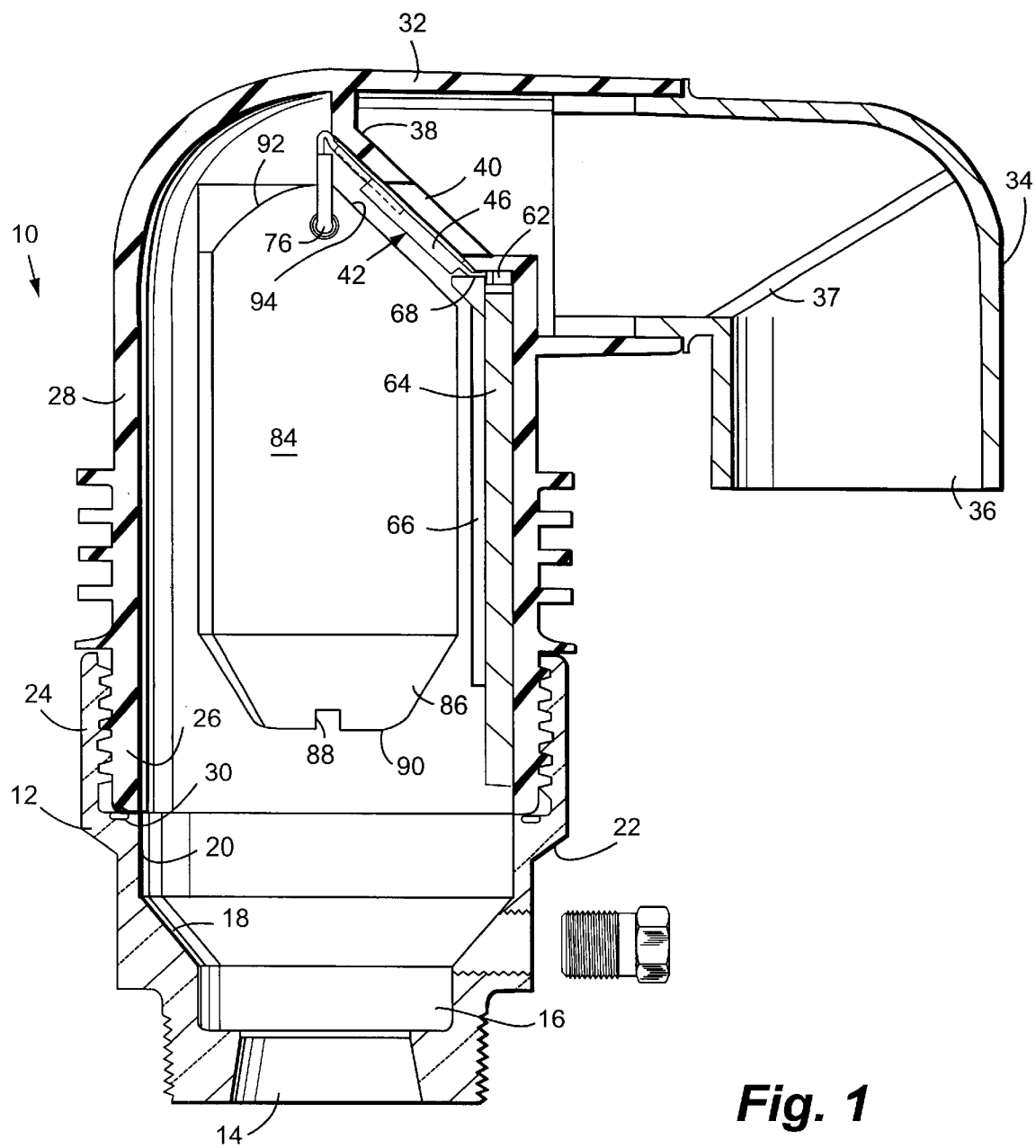
FIG. 1 is a side elevation, partly in section, illustrating a combination air release valve in accordance with an exemplary embodiment of the invention showing the valve in a closed position.

Referring to FIG. 1, the air release valve 10 includes a base 12 which includes an inlet 14 having an expansion portion 16, a tapered seat portion 18 and a smooth internal, cylindrical portion 20. Downstream of cylindrical portion 20 is a radial shoulder 22 and an upstanding, interiorly threaded connector portion 24. The connector portion 24 threadably receives the lower cylindrical end 26 of a valve housing 28. This end 26 is exteriorly threaded for mating threaded engagement with the connector portion 24 of the base 12, such that the lower edge of the housing abuts the radial shoulder 22, with an annular O-ring 30 sealing the joint interface.

The housing 26 extends vertically upwardly to a 90° elbow 32 which, in turn, connects to a second outlet elbow 34 including an outlet opening 36. The outlet 36 includes a protective screen 37 which keeps debris and pests from the operating components of the valve. At the upper end of the housing within the first elbow 32, there is an internal valve orifice plate 38 formed with a single aperture 40. Aperture 40 is in the form of a relatively large rectangular opening. The valve plate 38 extends angularly across the flow path, at about a 45° angle, from an inside corner of the elbow upwardly to an outside corner of the elbow.

A seal assembly 42 is configured to cover the aperture 40 when the valve is closed. With particularly reference to FIGS. 2 through 4, the seal assembly 42 comprises essentially a one-piece rubber body or diaphragm with a steel insert in a portion thereof, as further described below. The sealing portion is "outlined" generally by a raised bead 44 which defines a relatively large rectangular seal portion 46 and a relatively narrow tongue-like portion 48, the former adapted to seal aperture 40. This rectangular portion 46 is reinforced by a rigid stainless steel plate 50 which is embedded within the rubber body, i.e., the plate is placed in the seal assembly mold and the rubber body is formed about the plate. Other reinforcement techniques may be suitable as well.

In this improved valve seal assembly, an elongated groove 52 is formed in the diaphragm, lying partially within the area bounded by the tongue-like portion of the seal bead 44, with one end of the groove adapted to overlap the edge of the valve plate aperture 40. The groove 52 thus has two axial portions 54, 56, one of which (54) is formed directly in the flexible rubber body of the seal, and the other of which (56) is formed by removing (or omitting) the rubber covering over the reinforcement plate 50. Thus, the groove is stepped in the axial direction, such that portion 56 has a greater depth than portion 54 with the "step" 58 (FIG. 3) located on the boundary of aperture 40, as best seen in FIG. 3.

A housing mounting flange 60 extends from one side of the rectangular portion 46 remote from the tongue portion 48. This flange mounts the seal assembly 42 to the interior of the housing 28, adjacent the lower end of the valve orifice plate 38. The curved free end 62 of the flange 60 is captured thereby a retainer plate 64 slidably mounted in the housing 26 between a pair of vertically extending ribs (one partially shown at 66). The straight portion 68 of the flange 60 serves as a hinge for the seal assembly as described further below (see also FIG. 6). Note that the plate 64 is curved to generally match the curvature of the housing 28, but the radius of the retainer 64 may be slightly smaller than the radius of the housing 28 so that the retainer 64 will be held between the ribs 66 by friction. While not shown specifically in this application, the curvature of the retainer plate 64 vis-a-vis the housing is explained in detail in the '858 application.

Figure 3:
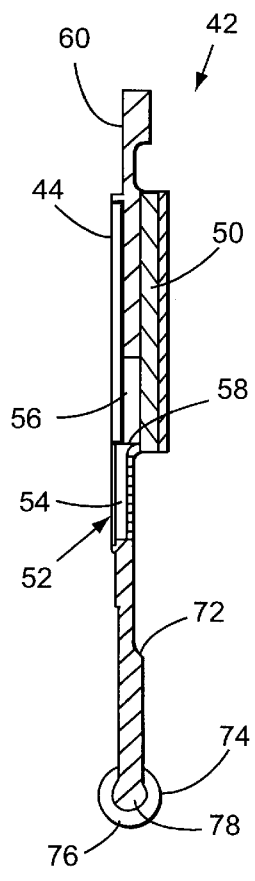
FIG. 3 is a side section taken along the line 3—3 in FIG. 2.
Figure 2:
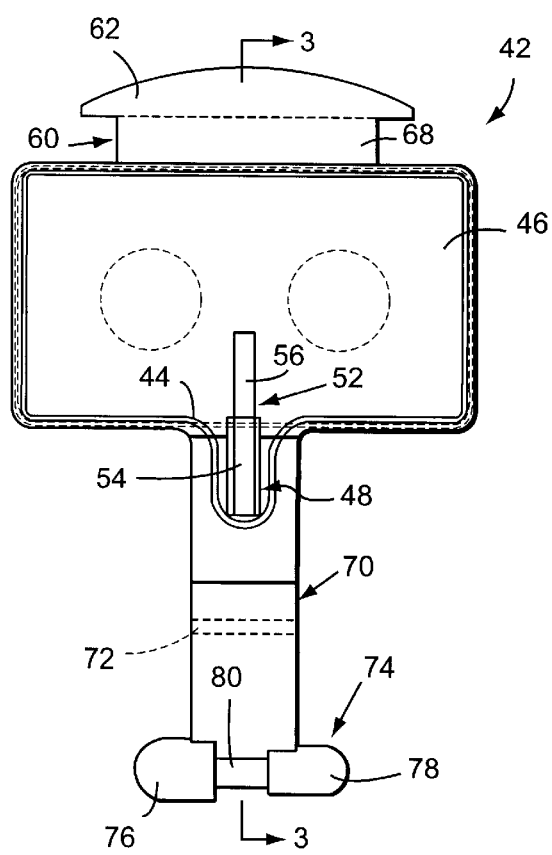
FIG. 2 is a top plan view of the valve seal assembly taken from FIG. 1.

Extending in the opposite direction from the seal portion 46 is a float mounting strap or web 70, and note that the tongue portion 48 of the seal extends into this web area, as best seen in FIGS. 2 and 3. Strap portion 70 is of reduced thickness throughout most of its length, with a thickened portion beginning at edge 72 and extending to a transverse "pin" 74.

Figure 6:
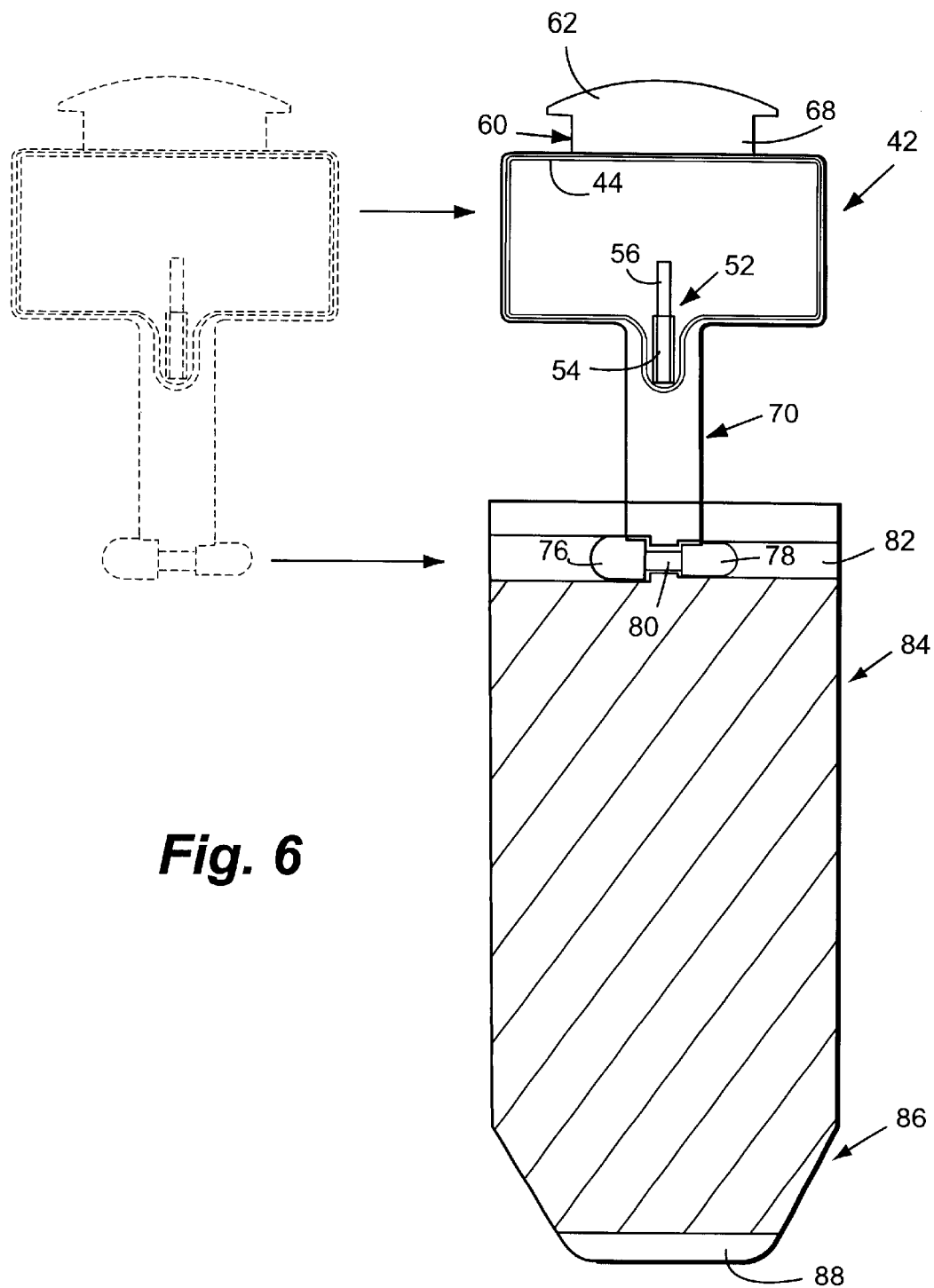
FIG. 6 is a side elevation, partly in section illustrating the manner in which the seal assembly is attached to the float.

The latter is formed with enlarged end portions 76, 78 separated by a smaller diameter portion 80. The "pin" may be slidably inserted in a slot 82 formed across the top of the float 84 (from left to right as viewed in FIG. 6), so that the smaller of the enlarged ends can be pushed past the reduced diameter neck 86 and snapped into place as shown in FIG. 6. In this way, the strap 70 is effectively captured in the slot 82. The seal assembly 42 is thus movable between open and closed positions vis-a-vis valve plate 38 in response to movement of the float 84.

The float 84 is substantially square in cross section, with a tapered, truncated lower end 86. A groove 88 extends across the flat bottom 90 of the lower end 86 of the float 84. The groove has a rectangular profile or channel shape, opening along the flat bottom 90. In a preferred arrangement, the groove has a depth of 0.155 plus or minus 0.015 inch, and a width of 0.20 inch. This design alleviates a problem when venturilike effects are developed in the inlet region of the valve. The slot or groove 88 provides a passage from a higher pressure region near the periphery of the valve to a lower pressure region in the center, equalizing the pressure and allowing the float 84 to rise and close the valve.

The upper part of the float body is curved at one side 92, and has a flat truncated surface 94 on the opposite side, surface 94 adjacent and substantially parallel to the valve plate 38.

Vertical ribs (not shown) are formed on the interior wall of the housing 28 to prevent rotation of the float within the housing 28 with minimal surface contact, as explained in greater detail in the co-pending '858 application. As explained in that application, the square shape of float 84 and the associated vertical ribs on the interior of the housing 28 prevent rotation of the float 84 and minimize surface friction between the housing and the float during movement of the latter. In other words, contact between the float 84 and the housing 28 is limited to point or line contact rather than to broad surface contact. Thus, areas where sediment may collect and cause the float to jam are eliminated. Further in this regard, the substantially square shape of the float 84 maximizes the area between the float and the housing that is available to pass both water and air.

It is important that the overall weight of the float and its specific gravity be adjusted to operate within an expected pressure range for the fluid within the conduit.

Figure 7:
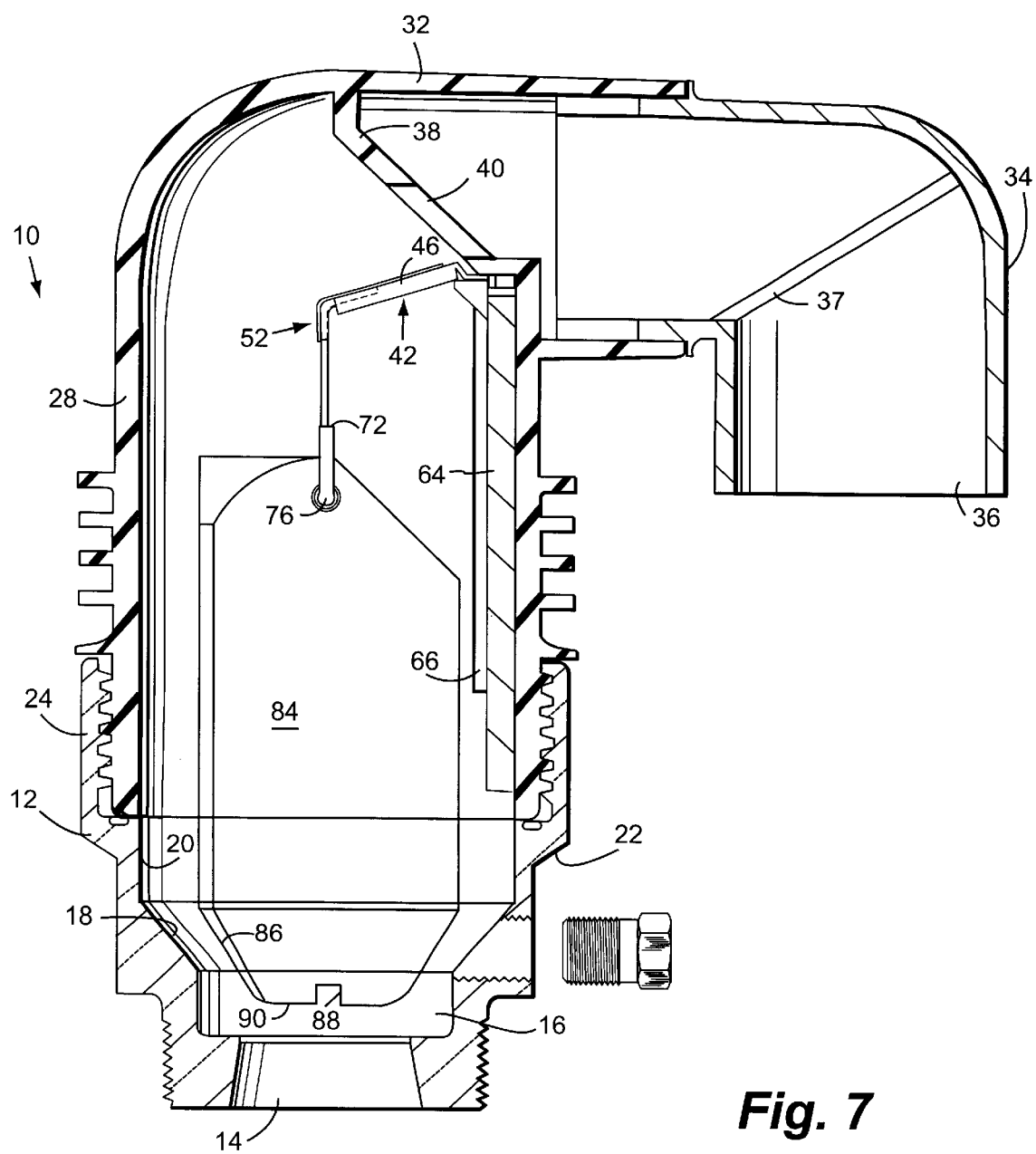
FIG. 7 is a side elevation, partly in section, similar to FIG. 1, but with the valve in a fully open position.

In use, and prior to the introduction of water into the conduit to which the valve 10 is secured (with the conduit running substantially perpendicular to the housing 28), the conduit as well as the valve 10 are typically filled with air. Under this condition, the float 84 is in its lowermost position as shown in FIG. 7, and with the aperture 40 fully open. As water begins to flow through the conduit, the housing 28 will begin to fill with water, expelling air through the aperture 40, and causing the float 84 to rise. As the water level continues to rise, the float will also rise, but only to the point where the larger opening 40 is substantially closed by portion 48 of the seal assembly, while any small amounts of air remaining in the system will escape through the groove 52. After substantially all of the air has been removed, and with the housing 28 filled with water, the float 84 will be at its highest position, with the seal assembly 42 sealing the aperture 38, as shown in FIG. 1.

During continued flow of water through the conduit, any small amounts of air which enter the system will rise to the top of the housing 28, causing the float 80 to drop slightly with the tongue portion 48 of the seal peeling away from the valve seat, thus opening a channel to the aperture 40 via groove 52, thus permitting small amounts of air to escape. Under normal conditions, the reinforced portion 46 will remain flush against the valve plate 38. It is believed that the peeling and unpeeling of the tongue portion 48 of the seal during the continuous air relief function, and thus the repeated flexing of the groove 52, facilitates a self-cleaning action which loosens and expels any debris which may be lodged in the groove.

Upon shut down, the float 84 will drop to the position shown in FIG. 7, with the rigid seal portion 46 pivoting away from the aperture 38, thus drawing air into the system to provide vacuum relief. The cycle is repeated on start-up as described above.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An air release valve comprising a housing having a fluid inlet and a fluid outlet, a valve plate within said housing between the inlet and outlet, the valve plate having an aperture therein; a valve seal assembly including a reinforced portion engageable with said valve plate overlying said aperture and a flexible portion having an elongated groove formed therein and at least partially overlapping an edge of said aperture; one end of said valve seal assembly secured to said housing; a float located in the housing upstream of the valve plate, with the opposite end of said seal assembly connected to an upper end of the float.

2. The valve of claim 1 wherein said housing is round and said float is generally square in cross section.

3. The air release valve of claim 1 wherein said reinforced portion comprises a metal plate embedded within said seal assembly.

4. The air release valve of claim 1 wherein a groove is formed across a flat bottom portion of the float.

5. The air release valve of claim 1 wherein said reinforced portion and said groove are surrounded by a raised sealing bead.

6. In a conduit for carrying a liquid, a combination air release valve comprising a housing having a fluid inlet and a fluid outlet, a float mounted for reciprocal axial movement in said housing; a seal assembly operatively connected at one end thereof to said float; a valve plate having an aperture therein, said seal assembly incorporating means cooperating with said movement of said float for:

a) purging relatively large amounts of air from said conduit upon initiating flow of liquid in said conduit;

b) releasing relatively small amounts of air from said conduit during continuous operation; and c) providing vacuum relief upon shutdown, by drawing air into said conduit through said aperture.

7. A combination air control valve comprising a housing having a flow inlet and a flow outlet; a float movable within said housing; a valve seat in said housing downstream of said float, said valve seat having a single substantially rectangular aperture therein; a seal assembly connected at one end to said float and at an opposite end to said housing, said seal assembly including a diaphragm having a raised sealing edge sealingly engageable with said valve plate to close said aperture when said float is in a first raised position; said diaphragm adapted to be pulled away from said aperture when said float moves to a second position; said diaphragm having an elongated groove formed therein, entirely within an area defined by said raised sealing edge, one end of said groove communicating with said aperture and the other end of said groove overlying said valve plate at a location proximate said one end of said seal assembly.

8. The air control valve of claim 7 wherein said diaphragm is rigidified in a first portion corresponding substantially to said aperture, but is flexible within a second portion corresponding to at least part of said elongated groove such that, when said float moves downwardly in said housing from said first position toward said second position, said diaphragm will peel away from said valve seat along said at least part of said elongated groove under a first condition and pivot away from said aperture under a second condition.

9. The air control valve of claim 8 wherein said groove has a first depth extending from said other end to said aperture, and a second greater depth in an area overlapping said aperture.

10. The air control valve of claim 8 wherein said housing is round and said float is generally square in cross section.

11. The air control valve of claim 8 wherein said groove is oriented substantially perpendicular to an edge of said aperture.

12. The air control valve of claim 8 wherein said float is formed with a groove along a lower surface thereof.

13. The air control valve of claim 7 wherein said diaphragm is pivotally secured to said housing at said opposite end thereof.

14. An air release valve comprising a housing having a fluid inlet and a fluid outlet, a valve plate within said housing between the inlet and outlet, the valve plate having an aperture therein; a valve seal assembly including a reinforced portion adapted to engage said valve plate and overlie said aperture, and a flexible portion extending from said reinforced portion with an elongated groove extending from said flexible portion into said reinforced portion and adapted to at least partially overlap an edge of said aperture; one end of said valve seal assembly secured to said housing; a float located in the housing upstream of the valve plate, with the opposite end of said seal assembly connected to an upper end of the float.

15. The air release valve of claim 14 wherein said reinforced portion and said groove are surrounded by a raised sealing bead.

* * * * *